Figures 1A, 1B:
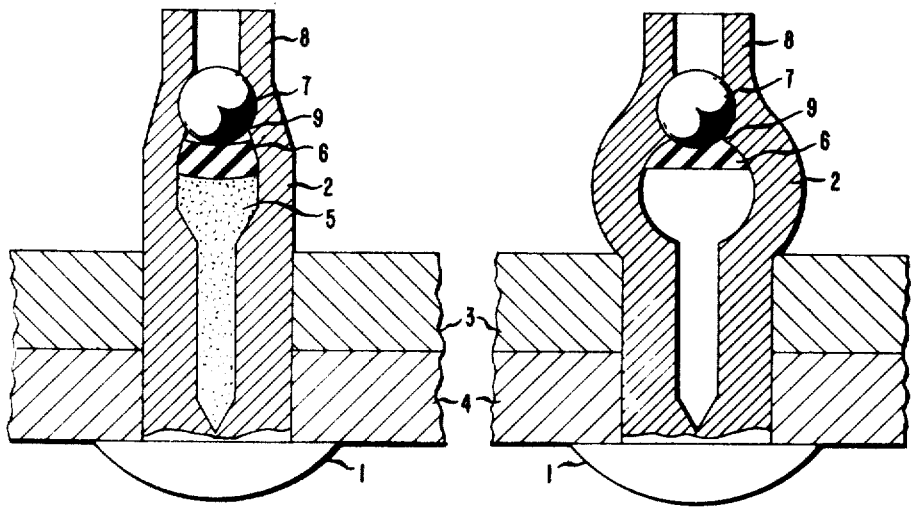

INVENTORS
JEAN B. BARBEAU
CHARLES R JOHNSON
CHARLES L. SCHRADER

United States Patent Office

2,956,469
Patented Oct. 18, 1960

2,956,469

EXPLOSIVELY OPERATED RIVET HAVING SPACER ELEMENT TO PREVENT FAILURE OF SHANK

Jean B. Barbeau, Pompton Lakes, N.J., Charles R. Johnson, Glen Mills, Pa., and Charles L. Schrader, Pompton Lakes, N.J., assignors to E. I. du Pont de Nemours and Company, Wilmington, Del., a corporation of Delaware Filed May 7, 1956, Ser. No. 583,191

6 Claims. (Cl. 85—40)

The present invention relates to rivets of the type known as chemically expanded rivets (sometimes called explosive rivets). More particularly, the present invention pertains to a novel chemically expanded rivet which is essentially noiseless in operation.

Rivets containing a chemical explosive charge in the shank portion have been known and used in the art for some time for the fastening of metal components which are inaccessible from one side. Characteristically, such a rivet includes a head portion and a shank portion having a central longitudinal recess. The explosive charge is loaded in this recess. The rivet shank is pressed through aligned holes in the two pieces which are to be joined. Heat is then applied to the head of the rivet which detonates the charge expanding the shank of the rivet in a manner which prevents separation of the pieces through which the shank extends. The expansion of the rivet shank is severe enough to lock the pieces to be joined firmly together. Chemically expanded rivets of this type have seen wide-spread use in the fastening of skin to airplane bodies, in the assembly of refrigerators, vehicle bodies and similar heavy-duty objects.

One of the limitations on the use of chemically expanded rivets has been the noise which results from their detonation. Of course, the larger the rivet (and the charge of the explosive contained therein), the greater the noise that results from its detonation. Furthermore, if a large number of rivets is being detonated in a single area, the noise developed can become so considerable as to seriously interfere with the efficiency and morale of personnel in the vicinity.

It has long been known that the noise developed by the detonation of a chemically expanded rivet is caused by the violent escape of gases from the open end of the rivet shank. Early attempts to prevent the sudden and explosive escape of these gases, as by screwing a plug into the open end of the rivet or by screwing a cap on the shank of the rivet, resulted in failure. The extreme pressure developed by the confined gases acts to strip the screw threads in any such arrangement and thus to dislodge the plug or cap and propel it outwardly like a projectile. Were it possible to retain such a screw-plug or cap in position upon detonation of the rivet, it would unquestionably act to confine the gases produced by the explosion and would thereby deaden the noise of the explosion.

In U.S. patent application Serial Number 373,629 filed August 11, 1953, and now Patent No. 2,807,184, granted September 24, 1957, in the name of R. J. Miller, having a common assignee with the present application, there is disclosed a later development in the production of a noiseless chemically expanded rivet. In the Miller application, a cylindrical plug having a roughened or serrated surface is loaded into the rivet shank atop the charge. The shank is then swaged or crimped about this plug, the roughened or serrated surface digging into the inner walls of the recess and thus effecting a relatively tight seal which will confine the gases developed upon detonation of the charge. The chemically expanded rivet disclosed in the Miller application is indeed noiseless and has achieved a widespread acceptance in the field. The chief disadvantage of this rivet does not relate to its performance but rather to its mode of manufacture and assembly. The cylindrical serrated plug cannot simply be dropped into the rivet shank by any convenient means. Because of its shape and configuration, great care must be exercised to insert such a plug into the shank recess at just the proper angle. This has naturally interfered with attempts to automate the production of noiseless rivets and considerable research effort has been expended in an attempt to overcome this difficulty.

It is an object of the present invention to provide a chemically expanded rivet which is essentially noiseless in operation. A further object of the invention is to provide such a rivet which may be manufactured in any convenient size without producing great noise or a flying missile upon detonation. A still further object of the invention is to provide such a rivet which is readily susceptible of automatic assembly so that it may be offered to the industry at an attractive price. Other and additional objects will become apparent from a consideration of the following specification and claims.

We have found that the foregoing objects are accomplished in a highly satisfactory manner when we provide the shank of a chemically expanded rivet with a closure that consists of a small spherical plug, a solid spacer element between the explosive charge and said spherical plug and a crimp or constriction in the outer end of the rivet shank to hold said plug and said spacer firmly in position. The nature and construction of said spherical plug and said spacer element will be more particularly hereinafter described.

Figure 2A:
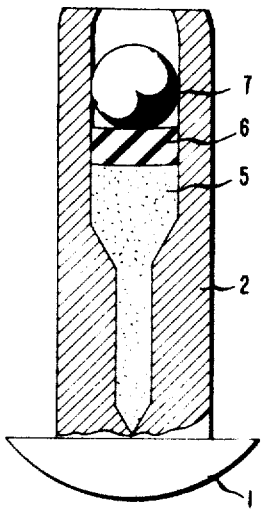
Figure 2B:
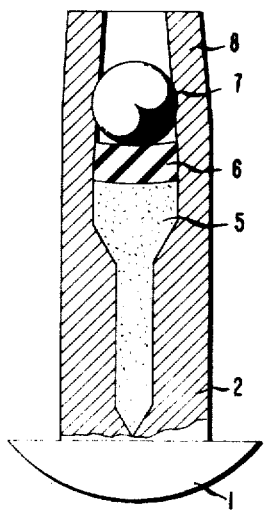
Figure 2C:
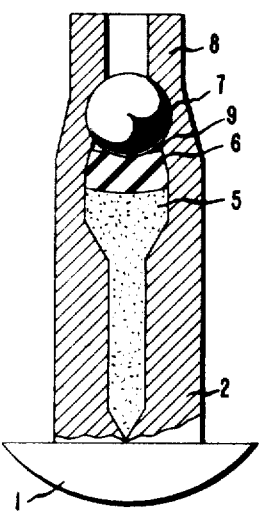

In order to describe the invention more clearly, reference is made to the accompanying drawings which are intended as illustrative only and are not to be construed as limiting the invention in any way. In the drawings, Figure 1a represents a rivet manufactured in accordance with the present invention and in position to secure two plates. Figure 1b depicts the rivet of Figure 1a after it has been expanded. Figures 2a, 2b, and 2c depict three stages of crimping or swaging the open end of the rivet shank after it has been loaded with all of its internal components.

In Figure 1a the rivet is shown as having a head 1 and a shank portion 2. The shank extends through aligned holes in two plate members 3 and 4 which are to be joined. A central longitudinal recess in the shank contains a charge of an explosive composition 5 at the end of which is positioned a spacer element 6 followed by a spherical metal plug 7. The outer end of the shank is sharply swaged as at 8 to lock the plug 7 and spacer 6 securely in position. In the swaging operation the shank will tend to "buckle" under the ball slightly, as at 9, which furthers the effectiveness of the gas seal. Figure 1b illustrates the rivet of Figure 1a after it has been expanded by the application of heat, as from a soldering iron (not shown), to the rivet head 1. The resultant expansion of the shank, indicated at 2', firmly secures the plates 3 and 4 between said expanded portion and the rivet head 1.

Figures 2a, 2b and 2c, respectively, illustrate the successive operations performed on the loaded rivet to swage or crimp the outer end by one convenient assembly technique. The shank of the rivet is first chamfered slightly, for example, by a coining die, as illustrated in Figure 2a. The rivet is then subjected to the successive action of a pair of compression dies, the second more severe than the first, to progressively swage the shank of the rivet around the spherical plug thus sealing the shank end of the rivet (Figures 2a and 2b). The resulting product is impervious to liquids and may be immersed, for example, in a paint bath for identification purposes or in chemical baths for metal treatment, and is also sufficiently tightly sealed to prevent the sudden escape of gases when the rivet is expanded. The expansion of the rivet will not result in a loud noise or report but rather in a mild, innocuous clicking sound which is not painful or disturbing to the human ear. The seal which is accomplished with this arrangement is not so completely gas tight that over a period of time some, or even all, of the gas in the interior of the rivet will not escape to the atmosphere. However, this in no way affects the operation or performance of the rivet. So long as the gases cannot rush suddenly and violently out of the shank recess, there will be no disturbing noise when the rivet is fired. If the gases are able to leak out slowly over a long period of time after the rivet is in place, the seal accomplished with the rivet is in no way disturbed.

Early attempts in the production of sealed, "noiseless" chemically expanded rivets indicated that smooth spherical inserts, such as the plug 7 illustrated in the attached drawings, were not entirely satisfactory. Because of the smooth round surface it was believed they would be too easily dislodged and projected out of the rivet shank when the rivet was fired. Further research has demonstrated that this is not the case if care is exercised to make the outer crimp severe enough. However, rivets which contain a single spherical plug only have not been satisfactory. The severe crimping necessary to retain such a plug securely in position upon firing of the rivet has resulted in cold working of the metal in the shank just below the plug. This phenomenon results in a weakening of the metal in this area which will sometimes lead to a hole being blown in the shank at this point rather than to expansion. When this occurs, the rivet fails.

We have found that use of a spherical plug, which is extremely desirable from a manufacturing standpoint since it can be dropped or loaded into the shank at any angle, necessitates the presence of some sort of a spacer element between the plug and the explosive charge. The spacer may have any shape and may conveniently be formed of any solid material which will serve to remove the spherical plug a short distance from the end of the charge. Such materials as exemplified by wood, plastics, elastomers, paper, cardboard, etc. are entirely satisfactory. Rubber is especially suitable because of the ease with which it may be handled and stamped and because of its inherent resiliency permits it to conform to the configuration of the spherical plug where it contacts that element. A rubber spacer tends to wedge its way into the crevice formed by the surface of the spherical plug and the inner wall of the shank. The gases under high pressure which result from explosion of the charge tend to force the rubber spacer even more tightly into this crevice, thus further enhancing the sealing action of the plug. With the cold worked portion of the rivet shank thus removed a short distance from the cavity in which the explosion occurs, the rivet will not fail but will consistently expand in the manner illustrated in Figure 2a to form a satisfactory and reliable joint.

Rivets of the present invention may be manufactured in any convenient size depending upon the specific function they are to ultimately perform. Rivets having shank diameters as small as one-eighth inch in diameter and as large as one-quarter inch in diameter have been satisfactorily prepared and fired making no greater noise than a mild metallic click. Rivets with larger and smaller dimensions are also operable.

The rivet itself may conveniently be formed of brass, aluminum or other metal. Likewise the spherical plug may be formed of any available metal although steel will be used in the normal case because of its economic advantages.

Having thus described the chemically expanded rivets of our invention in the foregoing specification it will be understood that many variations in form, material, and dimensions, as well as in mode of assembly, may be made without departing from the spirit of our invention. We intend, therefore, to be limited only by the following claims.

We claim:

1. A chemically expanded rivet comprising a head portion, a shank member having a central longitudinal recess affixed to said head portion, an explosive charge within said recess, a soft, readily deformable spacer element at the outer end of said explosive charge, and a smooth-surfaced, substantially spherical metal plug in said recess adjacent to said spacer on the side of the spacer remote from the explosive charge, said spacer and plug being held firmly in place by a severe constriction in the outermost end of the shank around the plug, said spacer element being of such composition and in such a configuration as facilitates its ready insertion into the central longitudinal recess, said spacer element serving to remove the spherical metal plug from that portion of the central shank recess containing the explosive charge whereby the section of the shank adjacent the plug which is cold-worked and weakened by the severe constriction of the outer end of the shank is physically separated from the explosive charge.

2. A rivet as in claim 1 wherein said spacer element is a small rubber plug.

3. A chemically expanded rivet comprising a head portion, a shank member having a central longitudinal recess affixed to said head portion, an explosive charge within said recess, a soft, readily deformable spacer element at the outer end of said explosive charge, and a smooth-surfaced, substantially spherical metal plug in said recess adjacent to said spacer on the side of the spacer remote from the explosive charge, said spacer and plug being held firmly in place by a portion on the outer end of the shank which is severely constricted such that the recess has a cross-sectional area significantly smaller than that of the plug, said spacer element being of such composition and in such a configuration as facilitates its ready insertion into the central longitudinal recess, said spacer element serving to remove the spherical metal plug from that portion of the central shank recess containing the explosive charge whereby the section of the shank adjacent the plug which is cold-worked and weakened by the severe constriction of the outer end of the shank is physically separated from the explosive charge.

4. A rivet as in claim 3 wherein said spacer element is a rubber plug.

5. A chemically expanded rivet comprising a head portion, a shank member having a central longitudinal recess affixed to said head portion, an explosive charge partially filling said recess, a smooth-surfaced, substantially spherical metal plug in said recess near its outer end, a soft, readily deformable spacer element between said explosive charge and said metal plug and a severe crimp in the end of said recessed shank member around said plug securely holding the plug and said spacer element in position adjacent said explosive charge, said spacer element being of such composition and in such a configuration as facilitates its ready insertion into the central longitudinal recess, said spacer element serving to remove the spherical metal plug from that portion of tne central shank recess containing the explosive charge whereby the section of the shank adjacent the plug which is cold-worked and weakened by the severe crimp in the outer end of the shank is physically separated from the explosive charge such that detonation of the charge will result in substantial and relatively uniform expansion of said shank member with a minimum of offensive noise.

6. A chemically expanded rivet comprising a head portion, a shank member having a central longitudinal recess affixed to said head portion, an explosive charge partially filling said recess, a smooth-surfaced, substantially spherical metal plug in said recess near its outer end, a rubber spacer element between said explosive charge and said metal plug, and a severe crimp in the end of said recessed shank member around said plug securely holding the plug and said spacer element in position adjacent said explosive charge, said rubber spacer element serving to remove the spherical metal plug from that portion of the central shank recess containing the explosive charge whereby the section of the shank adjacent the plug which is cold-worked and weakened by the severe crimp in the outer end of the shank is physically separated from the explosive charge such that detonation of the charge will result in substantial and relatively uniform expansion of said shank member with a minimum of offensive noise.

References Cited in the file of this patent

UNITED STATES PATENTS

| | | |
|---|---|---|
| 1,294,995 | Williams | Feb. 18, 1919 |
| 2,328,247 | Alexander | Aug. 31, 1943 |
| 2,367,883 | Miller | Jan. 23, 1945 |
| 2,779,278 | Klotz | Jan. 29, 1957 |
| 2,807,184 | Miller | Sept. 24, 1957 |

FOREIGN PATENTS

| | | |
|---|---|---|
| 711,417 | Great Britain | June 30, 1954 |

UNITED STATES PATENT OFFICE
CERTIFICATION OF CORRECTION

Patent No. 2,956,469                        October 18, 1960

Jean B. Barbeau et al.

It is hereby certified that error appears in the above numbered patent requiring correction and that the said Letters Patent should read as corrected below.

Column 4, lines 17 to 19, 39 to 41, and 59 to 61, strike out "being of such composition and in such a configuration as facilitates its ready insertion into the central longitudinal recess, said spacer element", each occurrence.

Signed and sealed this 9th day of May 1961.

(SEAL)
.ttest:

ERNEST W. SWIDER
ttesting Officer

DAVID L. LADD
                                   Commissioner of Patents